United States Patent
Chen et al.

(10) Patent No.: US 10,151,868 B2
(45) Date of Patent: Dec. 11, 2018

(54) BACKLIGHT MODULE AND DISPLAY DEVICE

(71) Applicants: Radiant Opto-Electronics (Suzhou) Co., Ltd., Jiangsu (CN); Radiant Opto-Electronics Corporation, Kaohsiung (TW)

(72) Inventors: Jui-Lin Chen, Kaohsiung (TW); Chao-Min Su, Kaohsiung (TW); Jing-Siang Jhang, Kaohsiung (TW); Hung-Pin Cheng, Kaohsiung (TW); Wei-Hsiang Chiu, Kaohsiung (TW); Bo-Lan Fang, Kaohsiung (TW); Wei Yi, Jiangsu (CN); Kuan-Tun Chen, Kaohsiung (TW); Li-Hui Chen, Kaohsiung (TW); Wei-Chung Lu, Kaohsiung (TW)

(73) Assignees: Radiant Opto-Electronics (Suzhou) Co., Ltd., Jiangsu (CN); Radiant Opto-Electronics Corporation, Koahsiung (TW)

(*) Notice: Subject to any disclaimer, the term of this patent is extended or adjusted under 35 U.S.C. 154(b) by 0 days.

(21) Appl. No.: 15/439,956

(22) Filed: Feb. 23, 2017

(65) Prior Publication Data
US 2017/0160460 A1 Jun. 8, 2017

Related U.S. Application Data

(63) Continuation of application No. PCT/CN2015/099772, filed on Dec. 30, 2015.

(30) Foreign Application Priority Data

Oct. 9, 2015 (CN) .......................... 2015 1 0649146

(51) Int. Cl.
*F21V 8/00* (2006.01)
*G01J 3/50* (2006.01)

(52) U.S. Cl.
CPC ............ *G02B 6/0026* (2013.01); *G01J 3/506* (2013.01); *G02B 6/009* (2013.01); *G02B 6/0031* (2013.01);
(Continued)

(58) Field of Classification Search
CPC .. G02B 6/0026; G02B 6/0031; G02B 6/0051; G02B 6/0083; G02B 6/0088; G01J 3/506
(Continued)

(56) References Cited

U.S. PATENT DOCUMENTS

| 6,528,937 | B1 * | 3/2003 | Van Gorkom | ....... G02B 6/0011 |
| | | | | 313/485 |
| 9,366,412 | B2 * | 6/2016 | Kim | .......................... F21V 9/08 |

(Continued)

FOREIGN PATENT DOCUMENTS

| CN | 1892341 A | 1/2007 |
| CN | 101806414 A | 8/2010 |

(Continued)

*Primary Examiner* — Bryon T Gyllstrom
(74) *Attorney, Agent, or Firm* — CKC & Partners Co., Ltd.

(57) ABSTRACT

A backlight module includes a light source, a light guide plate and a light-adjusting member. A light source chromaticity is measured from light generated by the light source. The light guide plate has a light-incident surface and a light-emitting surface. Light generated by the light source enters the light guide plate and emits out from the light-emitting surface. With the light-adjusting member, a first light guide plate chromaticity is measured from the light-emitting surface. There is a first difference value between the first light guide plate chromaticity and the light source chromaticity. Without the light-adjusting member, a second light guide plate chromaticity is measured from the light- (Continued)

emitting surface. There is a second difference value between the second light guide plate chromaticity and the light source chromaticity. The first difference value is different from the second difference value.

26 Claims, 14 Drawing Sheets

(52) U.S. Cl.
CPC ......... *G02B 6/0051* (2013.01); *G02B 6/0083* (2013.01); *G02B 6/0088* (2013.01)

(58) Field of Classification Search
USPC ........................................................ 362/606
See application file for complete search history.

(56) References Cited

U.S. PATENT DOCUMENTS

| | | | | |
|---|---|---|---|---|
| 2004/0240232 | A1* | 12/2004 | Choi | G02B 6/0026 362/583 |
| 2006/0221636 | A1* | 10/2006 | Ohashi | G02B 6/0068 362/612 |
| 2006/0291236 | A1* | 12/2006 | Hsu | G02B 6/005 362/561 |
| 2008/0151142 | A1* | 6/2008 | Noba | G02B 6/0023 349/65 |
| 2009/0034292 | A1* | 2/2009 | Pokrovskiy | G02B 6/0028 362/617 |
| 2011/0194306 | A1* | 8/2011 | Krijn | G02B 6/004 362/607 |
| 2013/0215361 | A1* | 8/2013 | Wang | G02B 6/002 349/62 |
| 2015/0253490 | A1* | 9/2015 | Zhang | G02B 6/0078 362/606 |

FOREIGN PATENT DOCUMENTS

| | | |
|---|---|---|
| CN | 102506350 A | 6/2012 |
| CN | 102661544 A | 9/2012 |
| CN | 102681049 A | 9/2012 |
| CN | 202649645 U | 1/2013 |
| CN | 103017032 A | 4/2013 |
| CN | 203190212 U | 9/2013 |
| CN | 104238189 A | 12/2014 |
| CN | 104620043 A | 5/2015 |
| CN | 205065312 U | 3/2016 |
| JP | 2003279985 A | 10/2003 |
| TW | 201215966 A | 4/2012 |
| TW | 201222099 A | 6/2012 |
| TW | I428672 B | 3/2014 |

* cited by examiner

BACKLIGHT MODULE AND DISPLAY DEVICE

RELATED APPLICATIONS

This application is a continuation application of International Application No. PCT/CN2015/099772 filed Dec. 30, 2015, which claims priority from China Patent Application Serial Number 201510649146.3, filed on Oct. 9, 2015. The entire contents of each of which are incorporated by reference.

BACKGROUND

Field of Invention

The present invention relates to a light source assembly. More particularly, the present invention relates to a backlight module and a display device.

Description of Related Art

A display device mainly includes a backlight module and a display panel. After entering a light guide plate in the backlight module, light generated by a light source in the backlight module emits out from the light guide plate and enters the display panel.

However, light generated by the light source has color difference before and after entering the light guide plate and the display panel. Alternatively, color of the light generated by the light source may be deviated from its predetermined color due to its operation or fabrication conditions, thus seriously affecting display effect of the display device.

SUMMARY

The invention provides a backlight module and a display device which can avoid color cast occurring at a light-incident side and a light-emitting side of a light guide plate and a display panel.

According to the aforementioned object, a backlight module is provided. The backlight module includes a light source, a light guide plate and a light-adjusting member. A light source chromaticity is obtained by measuring light generated by the light source. The light guide plate has a light-incident surface and a light-emitting surface, in which light generated by the light source enters the light guide plate from the light-incident surface and emits out from the light-emitting surface. With the light-adjusting member, a first light guide plate chromaticity is measured and obtained from the light-emitting surface of the light guide plate, and there is a first difference value between the first light guide plate chromaticity and the light source chromaticity. Without the light-adjusting member, a second light guide plate chromaticity is measured and obtained from the light-emitting surface of the light guide plate, and there is a second difference value between the second light guide plate chromaticity and the light source chromaticity, and the first difference value is different from the second difference value.

According to the aforementioned object, a display device is provided. The display device includes the aforementioned backlight module and a display panel. The display panel is disposed in front of the light-emitting surface of the light guide plate.

According to the aforementioned object, another display device is provided. The display device includes a light source, a light guide plate, a display panel and a light-adjusting member. The light guide plate has a light-incident surface and a light-emitting surface, in which light generated by the light source enters the light guide plate from the light-incident surface and emits out from the light-emitting surface. The display panel is disposed in front of the light-emitting surface. With the light-adjusting member, an adjusted light guide plate chromaticity is measured and obtained from the light-emitting surface of the light guide plate, and a first display panel chromaticity is measured and obtained from the display panel, and there is a first difference value between the adjusted light guide plate chromaticity and the first display panel chromaticity. Without the light-adjusting member, an original light guide plate chromaticity is obtained from the light-emitting surface of the light guide plate, and a second display panel chromaticity is measured and obtained from the display panel. There is a second difference value between the second display panel chromaticity and the original light guide plate chromaticity, and the first difference value is smaller than the second difference value.

According to the aforementioned object, another display device is provided. The display device includes a light source, a light guide plate, a display panel and a light-adjusting member. The light guide plate has a light-incident surface and a light-emitting surface, wherein light generated by the light source enters the light guide plate from the light-incident surface and emits out from the light-emitting surface. The display panel is disposed in front of the light-emitting surface. With the light-adjusting member, a first light guide plate chromaticity is measured and obtained from the light-emitting surface of the light guide plate, and there is a first difference value between the first light guide plate chromaticity and a required chromaticity. Without the light-adjusting member, a second light guide plate chromaticity is measured and obtained from the light-emitting surface of the light guide plate, and there is a second difference value between the second light guide plate chromaticity and the required chromaticity, and the first difference value is smaller than the second difference value.

According to an embodiment of the present invention, the light guide plate further has a bottom surface opposite to the light-emitting surface, and the light-adjusting member is disposed below the bottom surface and/or above the light-emitting surface of the light guide plate and located near the light-incident surface.

According to an embodiment of the present invention, the backlight module further includes a light source reflector disposed on a bottom surface of the light guide plate, in which the light-adjusting member is disposed between the light source reflector and the bottom surface located near the light-incident surface.

According to an embodiment of the present invention, the light source further includes a circuit board and plural light-emitting diodes disposed on the circuit board. The light-adjusting member is disposed between the circuit board and the light guide plate located near the light-incident surface.

According to an embodiment of the present invention, the light-adjusting member is an adhesive member with a color used to adhere the light guide plate to the circuit board.

According to an embodiment of the present invention, the backlight module further includes a diffusion sheet disposed on the light-emitting surface of the light guide plate, in which the light-adjusting member is disposed between a bottom surface of the diffusion sheet and the light-emitting surface. The light-adjusting member is located near the light-incident surface.

According to an embodiment of the present invention, one side of the diffusion sheet and the light-adjusting member extends beyond the light-incident surface of the light guide plate.

According to an embodiment of the present invention, the light-adjusting member is a film formed from ink.

According to the aforementioned embodiments of the present invention, the present invention uses the light-adjusting member to reduce the chromaticity difference value between the light source chromaticity and light guide plate chromaticity, the chromaticity difference value between the light guide plate chromaticity and the display panel chromaticity and the chromaticity difference value between the light guide plate chromaticity and the required chromaticity, thus solving the problems of the color cast between the light source and the light guide plate, the color cast between the light guide plate and the display panel or the color cast between the light guide plate and the required chromaticity.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
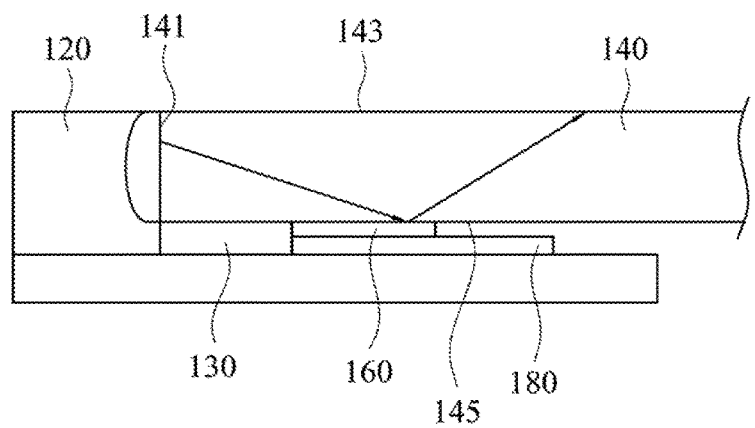
FIG. 1A is a schematic structural diagram showing a backlight module in accordance with a first embodiment of the present invention.
Figure 1B:
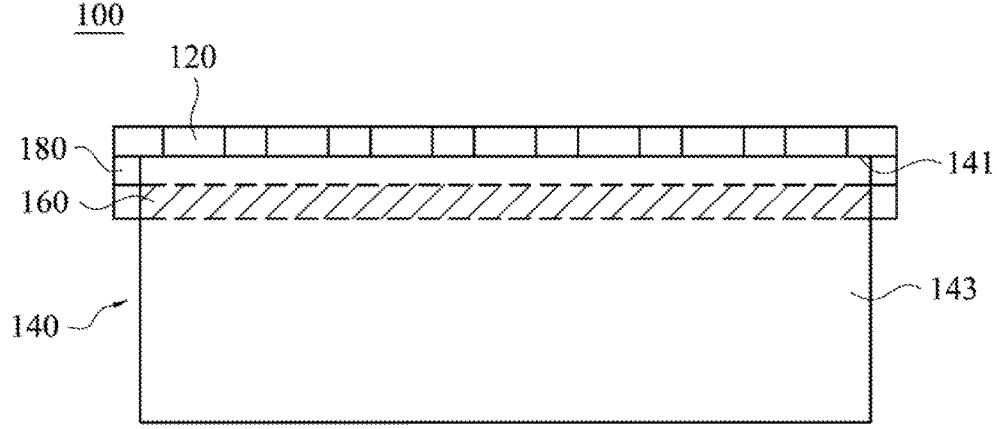
FIG. 1B is a schematic top view of the backlight module in accordance with the first embodiment of the present invention.

Referring to FIG. 1A and FIG. 1B, FIG. 1A is a schematic structural diagram and a schematic top view showing a backlight module 100 in accordance with a first embodiment of the present invention. The backlight module 100 of the present embodiment includes a light source 120, a light guide plate 140, a light-adjusting member 160 and a light source reflector 180. The light guide plate 140 has a light-incident surface 141, a light-emitting surface 143 and a bottom surface 145. The light-emitting surface 143 is opposite to the bottom surface 145, and the light-incident surface 141 connects the light-emitting surface 143 and the bottom surface 145. In one embodiment, the light guide plate 140 is connected to the light source 120 via an adhesive member 130 like as OCA (Optical Clear Adhesive). As shown in FIG. 1A and FIG. 1B, the light source reflector 180 is disposed below the bottom surface 145 of the light guide plate 140 near the light-incident surface 141, and the light-adjusting member 160 is disposed between the bottom surface 145 and the light source reflector 180. Therefore, one portion of light generated by the light source 120 enters the light guide plate 140 from the light-incident surface 141 and emits out from the light-emitting surface 143, and the other portion of light generated by the light source 120 can be reflected by the light-adjusting member 160 and enter the light guide plate 140 from the bottom surface 145 to emit out from the light-emitting surface 143.

Figure 1C:
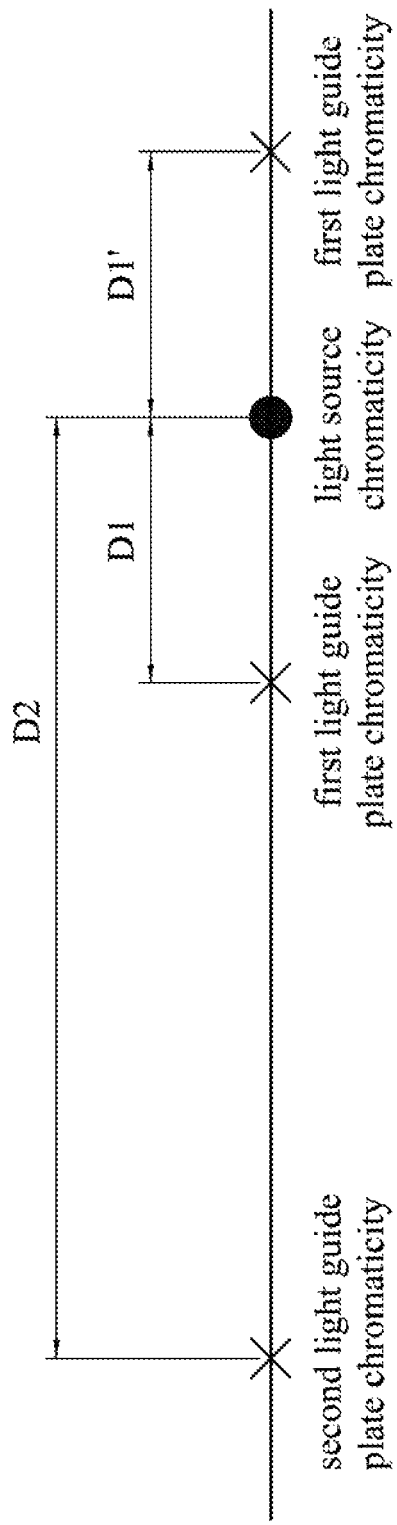
FIG. 1C is a schematic diagram showing a difference value between a light source chromaticity and a first light guide plate chromaticity, and a difference value between the light source chromaticity and a second light guide plate chromaticity.
Figure 2A:
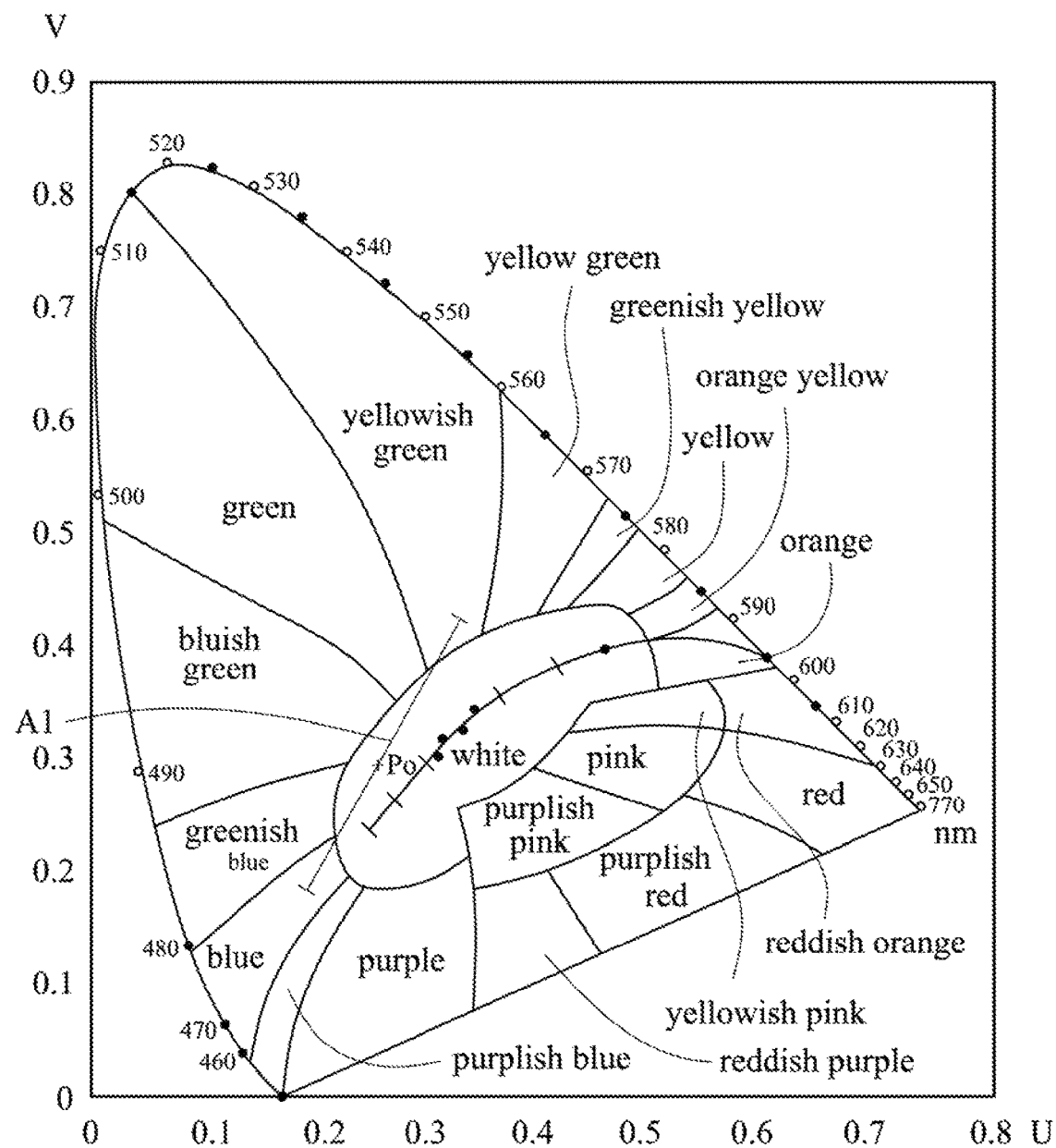
FIG. 2A is a schematic diagram showing a chromaticity coordinate diagram (International Commission on Illumination (CIE) 1931)

Simultaneously referring to FIG. 1A, FIG. 1C and FIG. 2A, in which FIG. 1C is a schematic diagram showing a difference value between a light source chromaticity and a first light guide plate chromaticity and a difference value between the light source chromaticity and a second light guide plate chromaticity, and FIG. 2A is a schematic diagram showing a chromaticity coordinate diagram (International Commission on Illumination (CIE) 1931). In FIG. 2A, numbers 460 nm-770 nm represents light wavelength. As shown in FIG. 1A, a light source chromaticity can be obtained by measuring light generated by the light source 120, and the light source chromaticity can be expressed by a chromaticity coordinate value of one point in the chromaticity coordinate diagram of 1931 CIE. After light generated by the light source 120 is affected by the light-adjusting member 160 and emits out from the light guide plate 140, a first light guide plate chromaticity is measured and obtained from the light-emitting surface of the light guide plate, and the first light guide plate chromaticity can be expressed by a chromaticity coordinate value of one point in the chromaticity coordinate diagram of 1931 CIE. As shown in FIG. 1C, there is a first difference value D1 (or D1') between the first light guide plate chromaticity and the light source chromaticity. In other words, light generated by the light source 120 has a first color, and light emitting from the light-emitting surface 143 has a second color. The first color is different from the second color.

Figure 3:
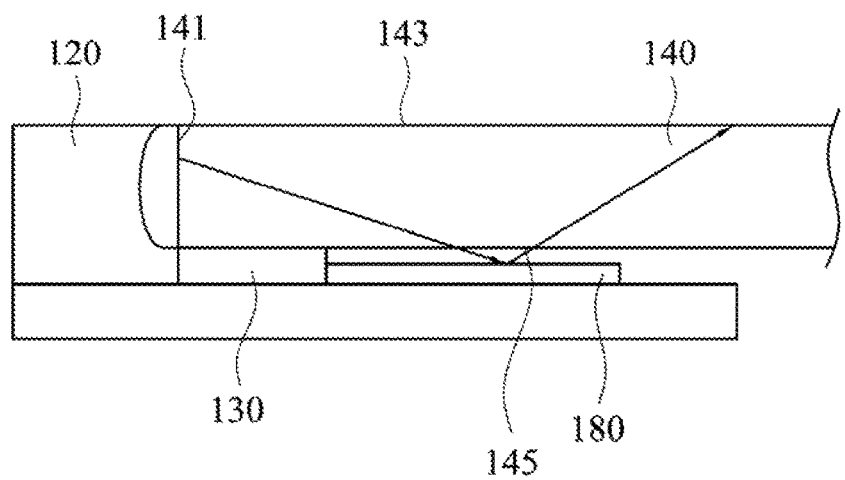
FIG. 3 is a schematic structural diagram showing a backlight module without using a light-adjusting member.

Simultaneously referring to FIG. 2A and FIG. 3, FIG. 3 is a schematic structural diagram showing a backlight module 200 without using a light-adjusting member. The backlight module 200 shown in FIG. 3 includes the aforementioned light source 120, the aforementioned light guide plate 140 and the aforementioned light source reflector 180, but does not have the light-adjusting member 160 shown in FIG. 1A and FIG. 1B. In the backlight module 200, one portion of light generated by the light source 120 enters the light guide plate 140 from the light-incident surface 141 and emits out from the light-emitting surface 143. The other portion of light generated by the light source 120 is directly reflected by the light source reflector 180 and enters the light guide plate 140 from the bottom surface 145 to emit out from the light-emitting surface 143. Therefore, when light generated by the light source 120 is not adjusted by the light-adjusting member 160 and emits from the light guide plate 140, a second light guide plate chromaticity is measured and obtained from the light-emitting surface of the light guide plate, and the second light guide plate chromaticity can be expressed by a chromaticity coordinate value of one point in the chromaticity coordinate diagram of 1931 CIE. Referring to FIG. 1C again, in the present embodiment, there is a second difference value D2 between the second light guide plate chromaticity and the light source chromaticity. In other words, when the light-adjusting member 160 shown in FIG. 1A and FIG. 1B is not applied to adjust the light generated by the light source 120, light emitting from the light-emitting surface 143 has a third color. The third color is different from the first color and is different from the second color.

As shown in FIG. 1C, in one embodiment, the first difference value D1 (or D1') is different from the second difference value D2. In the present embodiment, the first difference value D1 (or D1') is smaller than the second difference value D2. Generally, when light generated by the light source 120 is not adjusted by the light-adjusting member 160 and emits out from the light guide plate 140, unwanted color cast (the second difference value D2) would be caused). When the light-adjusting member 160 is applied to adjust the light generated by the light source 120, a color difference value (the first difference value D1 or D1') between the light entering the light guide plate 140 and the light emitting out from the light-emitting surface 143 would be relatively small, meaning that the color cast is small. Therefore, the function of the light-adjusting member 160 is to reduce the color difference value between the incident light and the exit light, so as to solve the problem of the color cast caused by the light generated by the light source 120 passing through the light guide plate 140. It is noted that herein, "color cast" described in the present disclosure is denoted by the second difference value D2, which can be easily detected by naked eyes. The first difference value D1 (or D1') denoted in the disclosure is smaller, meaning that the "color cast" cannot be easily detected by the naked eyes (that also can be considered as no color cast). Generally, because errors usually occur during operation or assembly of a product, the first difference value D1 (or D1') is within a reasonable and acceptable range set in accordance with user (or client) requirements.

In the present embodiment, the light-adjusting member 160 is colored, and the color of the light-adjusting member 160 also can be expressed by a chromaticity coordinate value of one point in the chromaticity coordinate diagram of 1931 CIE. Therefore, the color of light generated by the light source 120 can be changed by the light-adjusting member 160 before emitting out from the light-emitting surface 143 of the light guide plate 140.

In one embodiment, color of the light-adjusting member 160 is complementary to the color represented by the chromaticity of the light source 120. The complementary colors can be selected by drawing a line segment (for example A1) on the CIE 1931 shown in FIG. 2A, in which the line segment A1 passes through a point P0 in a white color area, and two end points of the line segment A1 are not located in the white color area. Colors represented by the chromaticity coordinate values of the two end points of the line segment A1 are complementary to each other. For example, the chromaticity coordinate values of the two end points of the line segment A1 represent blue and yellowish green which are complementary colors. In other words, if it is desired to adjust the bluish light to a white light represented by the chromaticity coordinate value of the point P0, a yellowish green light-adjusting member 160 has to be used. Meanwhile, the chroma of the color of the light-adjusting member 160 may determine the change magnitude of the bluish light. In other words, the distances between two ends of the line segment A1 and the point P0 can be adjusted according to the chroma of the color.

Figure 2B:
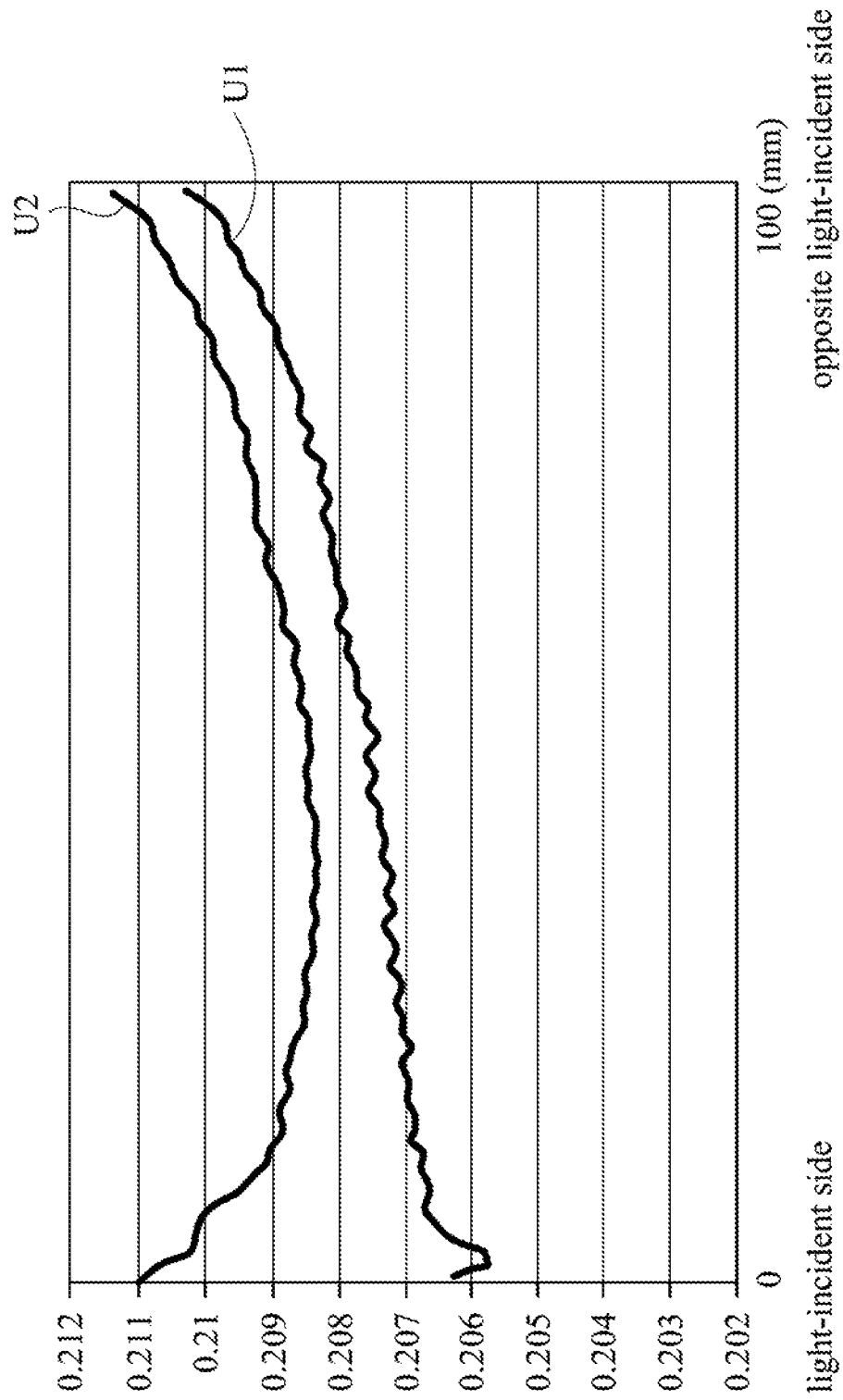
FIG. 2B is a curve diagram showing color difference variations along a U-axis shown in FIG. 2A.
Figure 2C:
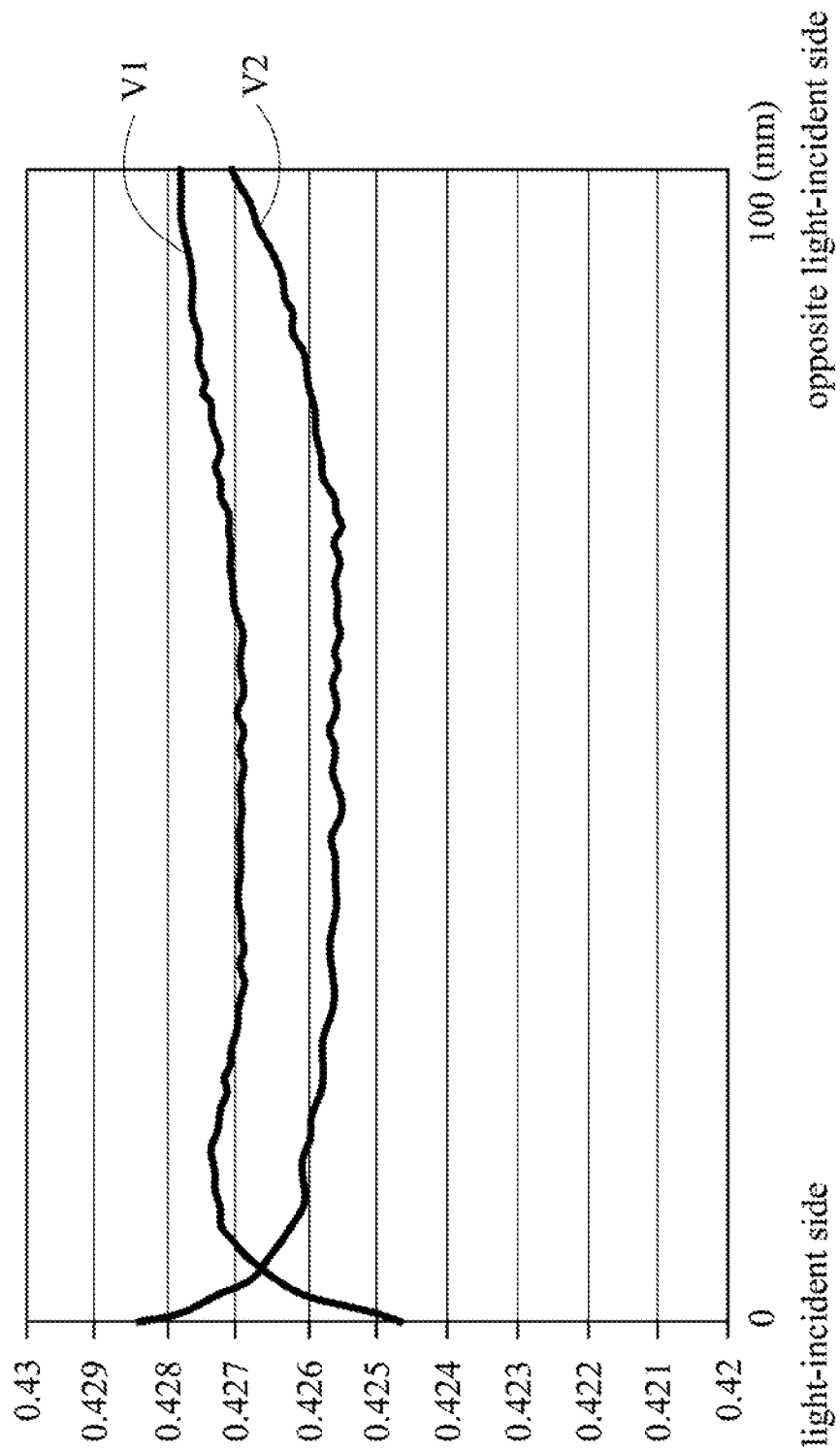
FIG. 2C is a curve diagram showing color difference variations along a V-axis shown in FIG. 2A.

Simultaneously referring to FIG. 2B and FIG. 2C, FIG. 2B and FIG. 2C are curve diagrams showing color difference variations along a U-axis and V-axis shown in FIG. 2A. In one example, In the absence of the light-adjusting member 160, a line U1 in FIG. 2B and a line V1 in FIG. 2C indicate that the light near a light-incident side of the light guide plate 140 has smaller U-axis and V-axis value, and the light near a side opposite to the light-incident side (hereinafter referred to as "opposite light-incident side") of the light guide plate 140 has greater U-axis and V-axis values, thus resulting in great color difference value between the light-incident side and the "opposite light-incident side" of the light guide plate 140. After the light-adjusting member 160 is applied, as shown in a line U2 in FIG. 2B and a line V2 in FIG. 2C, the U-axis and V-axis values at the light-incident side of the light guide plate can be increased to be close to those at the opposite light-incident side of the light guide plate 140, so as to reduce the color difference value between the light-incident side and the opposite light-incident side of the light guide plate 140. Therefore, the use of the light-adjusting member 160 can overcome the problem of color cast on the light-incident side without over affecting the color difference at the opposite light-incident side of the light guide plate 140.

Figure 4:
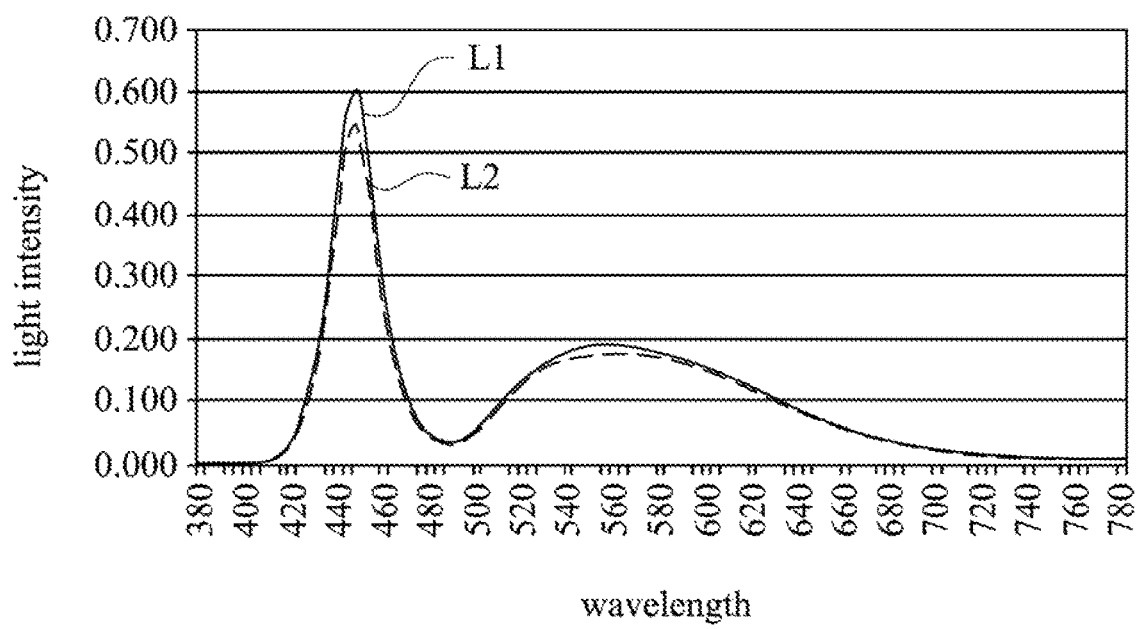
FIG. 4 is a comparison diagram showing light intensities of backlight modules with the light-adjusting member and without the light-adjusting member.

Referring to FIG. 1A, FIG. 3 and FIG. 4, in which FIG. 4 is a comparison diagram showing light intensities of backlight modules with the light-adjusting member and without the light-adjusting member. In the absence of light-adjusting member 160, as shown in curve line L1 in FIG. 4, light generated by the light source 120 is bluish white light. In the case of using yellow light-adjusting member 160, after being reflected by the light-adjusting member 160, light generated by the light source 120 can be adjusted into yellowish light (as shown in curve line L2 in FIG. 4). In the case of FIG. 4, when the color of light generated by the light source 120 is bluish white, the light-adjusting member 160 with a mixture color of yellow and red can be used to reduce the energy of blue light wavelength by 8.5% and to reduce the energy of green light wavelength by 5.6%. Therefore, by using the light-adjusting member 160 to reduce the energy of blue light and green light at the light-incident side of the backlight module 100, U-axis value and V-axis value of the light-incident side of the light guide plate can be increased, thus reducing the color difference value. It is noted that, the bluish white light generated by the light source 120 and the yellow light-adjusting member 160 are merely used as an example for explanation, and embodiments of the present invention are not limited thereto. In other embodiments, the color of the light-adjusting member 160 is designed according to the color of light generated by the light source 120 or the color of light generated by the light source 120 after entering the light guide plate 140.

Referring to FIG. 1A, in the present embodiment, the light-adjusting member 160 is disposed on the light source reflector 180 and is located between the bottom surface 145 of the light guide plate 140 and the light source reflector 180. In some embodiments, the light-adjusting member 160 is a film formed from ink and can be directly adhered on the light source reflector 180. In other embodiment, the light-adjusting member 160 can be directly printed or coated on the light source reflector 180.

Figure 5:
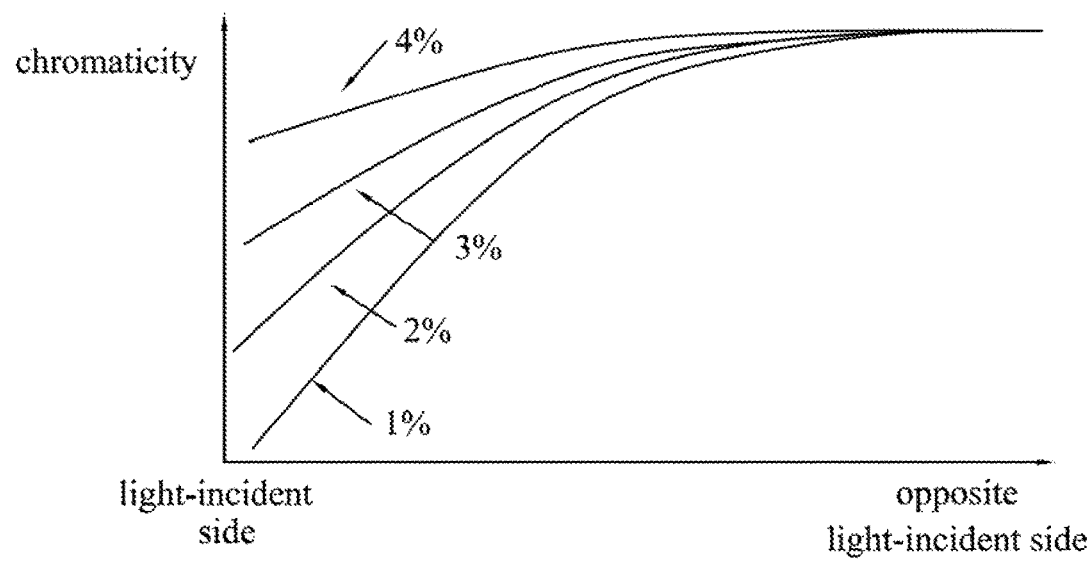
FIG. 5 is a curve diagram showing chromaticity differences between a light-incident side and an opposite light-incident side of a light guide plate affected by different light-adjusting members formed from different ink concentrations.

Simultaneously referring to FIG. 1A and FIG. 5, FIG. 5 is a curve diagram showing chromaticity differences between a light-incident side and an opposite light-incident side of the light guide plate affected by different light-adjusting members formed from different ink concentrations. In some embodiments, the light-adjusting members 160 formed by different concentrations of ink have different effects on light generated by the light source 120. For example, the higher concentration of the ink of the light-adjusting members 160 is, the smaller chromaticity difference value between the light-incident side and the opposite light-incident side of the light guide plate 140 will be. For example, the chromaticity difference value between the light-incident side and the opposite light-incident side of the light guide plate 140 generated by using the light-adjusting members 160 formed from 4% ink is smaller than the chromaticity difference value between the light-incident side and the opposite light-incident side of the light guide plate 140 generated by using the light-adjusting members 160 formed from 1% ink.

Figure 6A:
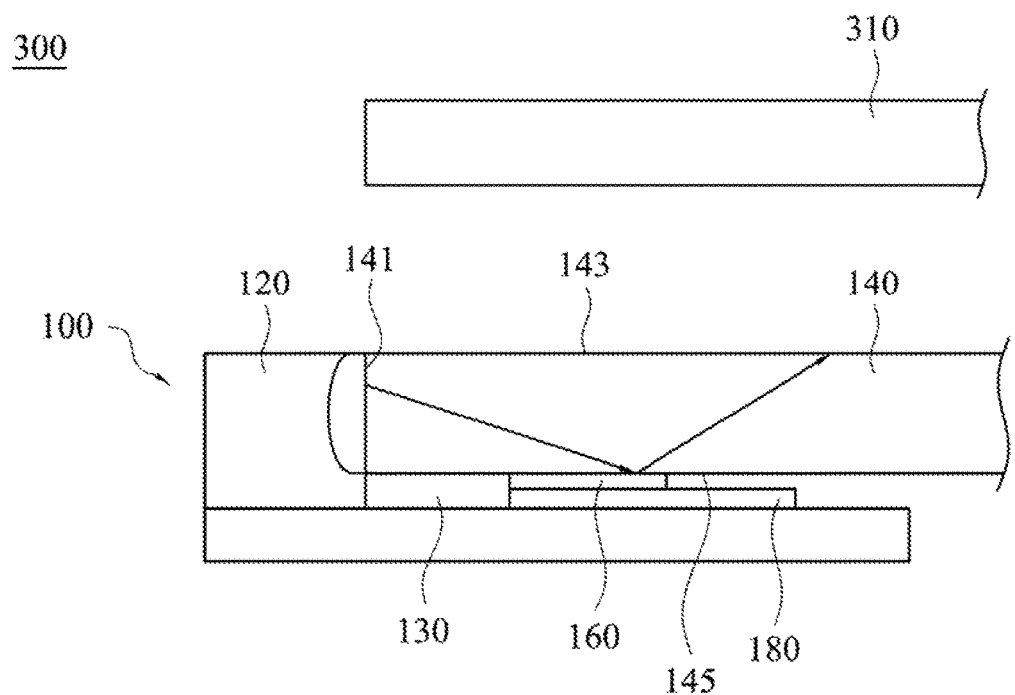
FIG. 6A is a schematic structural diagram showing a display device in accordance with a second embodiment of the present invention.
Figure 6B:
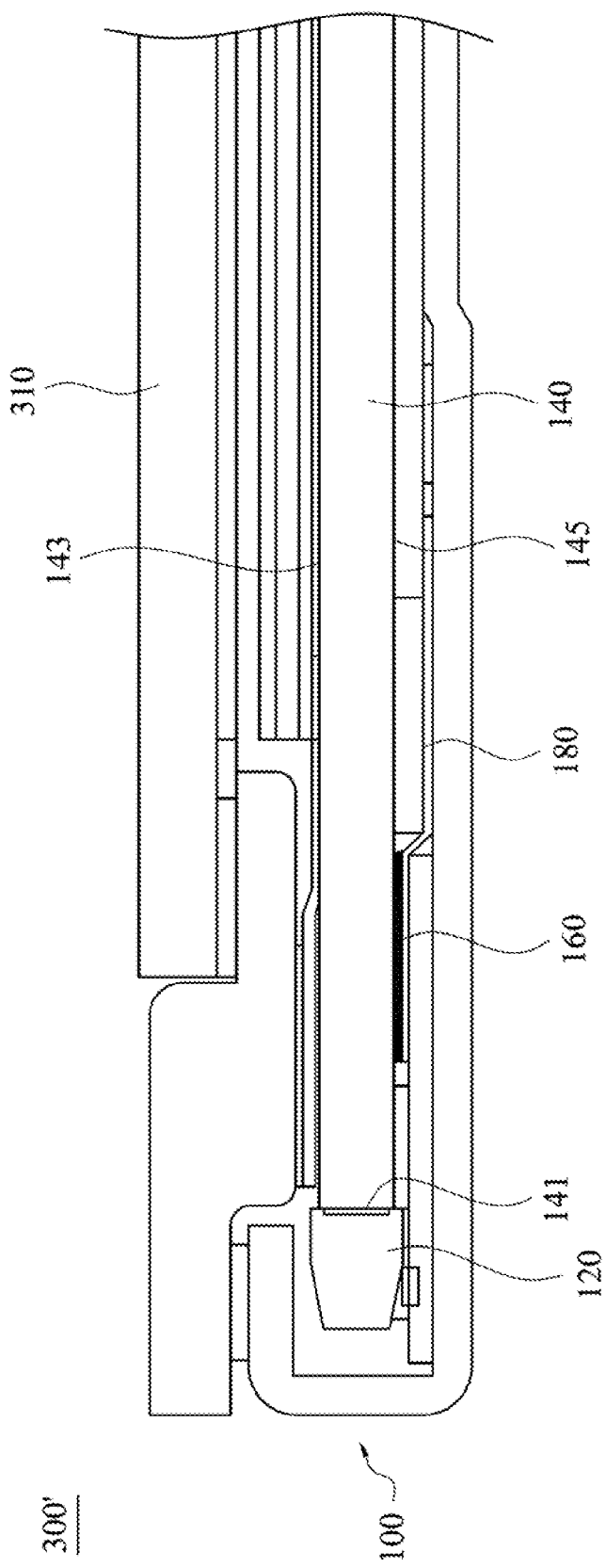
FIG. 6B is a schematic structural diagram showing another display device in accordance with the second embodiment of the present invention.
Figure 6C:
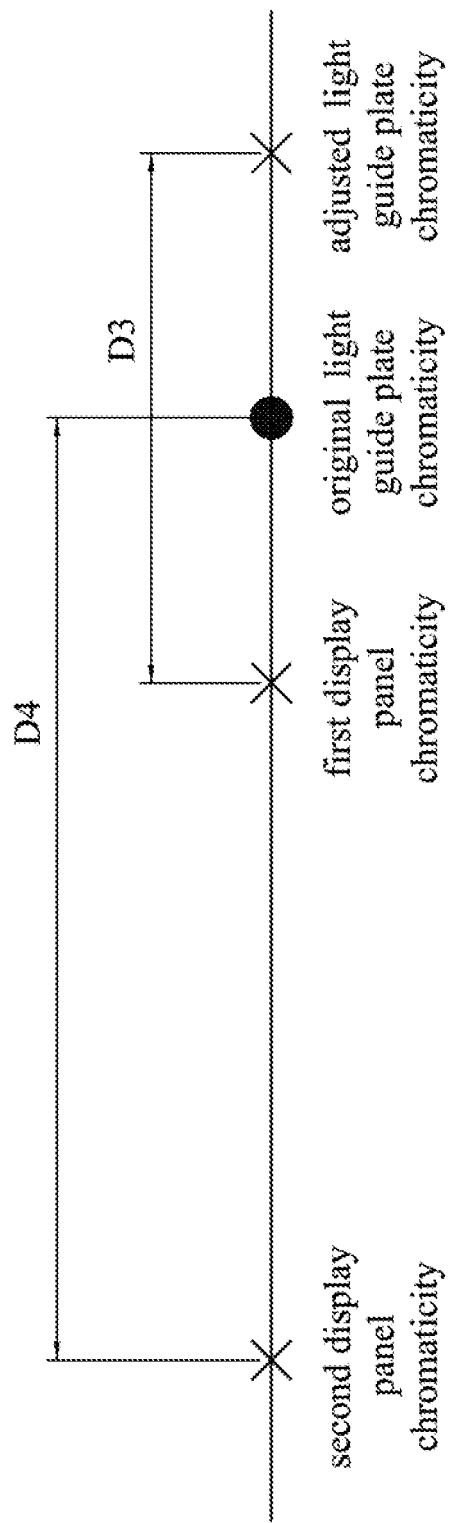
FIG. 6C is a schematic diagram showing a difference value between an adjusted light guide plate chromaticity and a first display panel chromaticity, and a difference value between an original light guide plate chromaticity and a second display panel chromaticity in accordance with the second embodiment of the present invention.

Simultaneously referring to FIG. 6A and FIG. 6C, in which FIG. 6A is a schematic structural diagram showing a display device 300 in accordance with a second embodiment of the present invention, and FIG. 6C is a schematic diagram showing a difference value between an adjusted light guide plate chromaticity and a first display panel chromaticity, and a difference value between an original light guide plate chromaticity and a second display panel chromaticity in accordance with the second embodiment of the present invention. When the backlight module 100 shown in FIG. 1A is applied to the display device 300, after light generated by the light source 120 is affected by the light-adjusting member 160 and emits from the light guide plate 140, an adjusted light guide plate chromaticity is measured and obtained from the light-emitting surface 143 of the light guide plate 140, and the light guide plate chromaticity can be expressed by a chromaticity coordinate value of one point in the chromaticity coordinate diagram of 1931 CIE shown in FIG. 2A. After emitting from the light-emitting surface 143 of the light guide plate 140, entering a display panel 310 disposed in front of the light guide plate 140 and emitting out from the display panel 310, a first display panel chromaticity is measured and obtained from the display panel 310, and the display panel chromaticity can be expressed by a chromaticity coordinate value of one point in the chromaticity coordinate diagram of 1931 CIE shown in FIG. 2A. There is a first difference value D3 between the first display panel chromaticity and the adjusted light guide plate chromaticity. In other words, light emitting from the light-emitting surface 143 of the light guide plate 140 has a first color, and light emitting from the display panel 310 has a second color. The second color is different from the first color. Referring to FIG. 6B, FIG. 6B is a schematic structural diagram showing another display device 300' in accordance with the second embodiment of the present invention. The backlight module 100 shown in FIG. 1A can also be applied to the display device 300' shown in FIG. 6B. The structure of the display device 300' shown in FIG. 6B is similar to that of the display device 300 shown in FIG. 6A, and will not be described again herein.

Figure 7:
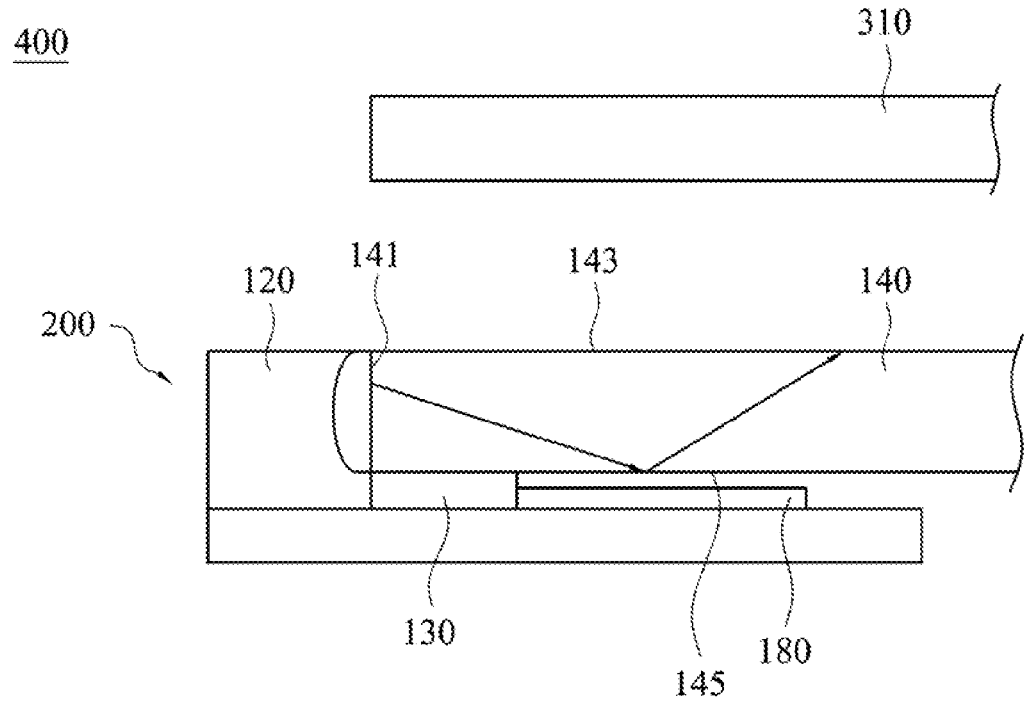
FIG. 7 is a schematic structural diagram showing a display device without using the light-adjusting member.

Simultaneously referring to FIG. 3 and FIG. 7, FIG. 7 is a schematic structural diagram showing a display device 400 without using the light-adjusting member. When the back light module 200 is applied to the display device 400, because the backlight module 200 does not have the light-adjusting member 160 shown in FIG. 1A and FIG. 1B, a portion of light generated by the light source 120 enters the light guide plate 140 from the light-incident surface 141 and emits out from the light-emitting surface 143. After emitting out from the light-emitting surface 143 of the light guide plate 140, light enters the display panel 310 disposed in front of the light guide plate 140 and emits out from the display panel 310. Therefore, a second display panel chromaticity is measured and obtained from the display panel 310, and the second display panel chromaticity can be expressed by a chromaticity coordinate value of one point in the chromaticity coordinate diagram of 1931 CIE shown in FIG. 2A. In the absence of light-adjusting member 160, an original light guide plate chromaticity is obtained from the light-emitting surface 143 of the light guide plate 140, which means that the light emitting from the light-emitting surface 143 of the light guide plate 140 and passing through the display panel 310 has a third color. Referring to FIG. 6C again, in the present embodiment, there is a second difference value D4 between the second display panel chromaticity and the original light guide plate chromaticity. In other words, the third color is different from the first color of light affected by the light-adjusting member 160 and emitting out from the light guide plate 140 and is also different from the second color.

As shown in FIG. 6C, in the present embodiment, the first difference value D3 is smaller than the second difference value D4. In other words, in the case of using the light-adjusting member 160, light emitting from the light-emitting surface 143 of the light guide plate 140 and passing through the display panel 310 has less color cast than in the absence of light-adjusting member 160. Similarly, the light-adjusting member 160 is colored, and the color of the light-adjusting member 160 can be designed according to the second display panel chromaticity which is measured and obtained from the display device 400 without using the light-adjusting member 160. Therefore, after light generated by the light source 120 is affected by the light-adjusting member 160, the color of light emitting out from the light-emitting surface 143 of the light guide plate 140 and the display panel 310 can be changed.

From the above, in the absence of light-adjusting member 160, light generated by the light source 120 has the light source chromaticity, light emitting out from the light guide plate 140 has the light guide plate chromaticity, and light emitting out from the light-emitting surface 143 of the light guide plate 140 and passing through the display panel 310 has the display panel chromaticity. Moreover, if the difference value between the aforementioned chromaticity is greater, more obvious color cast will be caused. Therefore, the color of the light-adjusting member 160 can be designed according to the aforementioned chromaticity, so as to reduce the difference value between the aforementioned chromaticity. Take the line segment A1 shown in FIG. 2A for example, a yellowish green light-adjusting member 160 can be used to adjust a bluish light into a white light represented by the chromaticity coordinate value of the point P0. In addition, the chroma of the color of the light-adjusting member 160 can be changed according to the distance to the point P0.

Figure 6D:
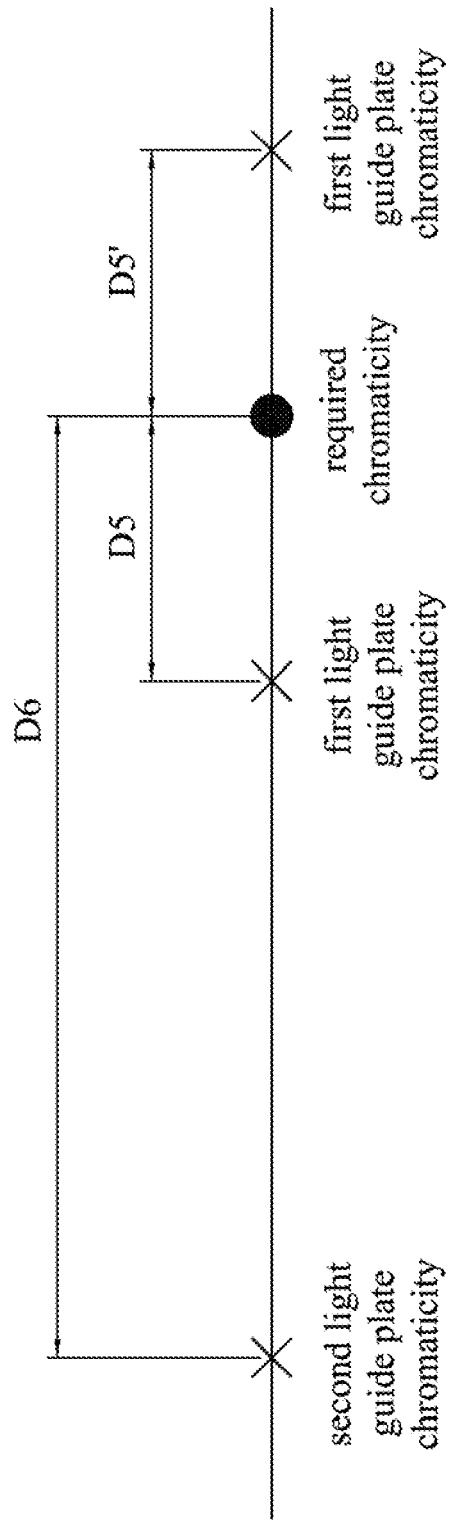
FIG. 6D is a schematic diagram showing a difference value between a required chromaticity and a first light guide plate chromaticity, and a difference value between the required chromaticity and a second light guide plate chromaticity in accordance with the second embodiment of the present invention.

On the other hand, users can request a required chromaticity of a display device, and the light-adjusting member 160 can be used to adjust the light-emitting chromaticity of the display device, so as to adjust the light-emitting chromaticity to be close or identical to the required chromaticity. As shown in FIG. 6A and FIG. 6D, FIG. 6D is a schematic diagram showing a difference value between a required chromaticity and a first light guide plate chromaticity, and a difference value between the required chromaticity and a second light guide plate chromaticity in accordance with the second embodiment of the present invention. In the case of using the light-adjusting member 160, after light generated by the light source 120 is reflected by the light-adjusting member 160 and emits out from the light guide plate 140, a first light guide plate chromaticity is measured and obtained from the light-emitting surface 143 of the light guide plate 140, and the first light guide plate chromaticity can be expressed by a chromaticity coordinate value of one point in the chromaticity coordinate diagram of 1931 CIE in FIG. 2A. If the chromaticity of light emitting from the light guide plate 140 and passing through the display panel 310 is consistent, there is a first difference value D5 (or D5') between the first light guide plate chromaticity and the required chromaticity. As shown in FIG. 6D and FIG. 7, in the absence of light-adjusting member 160, after light generated by the light source 120 is reflected by the light-adjusting member 160, a second light guide plate chromaticity can be obtained by measuring the light-emitting surface 143 of the light guide plate 140, and the second light guide plate chromaticity can be expressed by a chromaticity coordinate value of one point in the chromaticity coordinate diagram of 1931 CIE in FIG. 2A. If the chromaticity of light emitting from the light guide plate 140 and passing through the display panel 310 is consistent, there is a second difference value D6 between the second light guide plate chromaticity and the required chromaticity. In the present embodiment, the first difference value D5 (or D5') is smaller than the second difference value D6. In other words, the smaller first difference value D5 (or D5') means that the light guide plate chromaticity is more close to the required chromaticity requested by users. Take the line segment A1 shown in FIG. 2A for example, if the color of light represented by the chromaticity coordinate value of the point P0 is the color requested by the users and the second light guide plate chromaticity is bluish, a yellowish green light-adjusting member 160 can be used to adjust a bluish light into a white light represented by the chromaticity coordinate value of the point P0 (i.e. the first light guide plate chromaticity). In addition, the chroma of the color of the light-adjusting member 160 can be changed according to the distance to the point P0.

Figure 8:
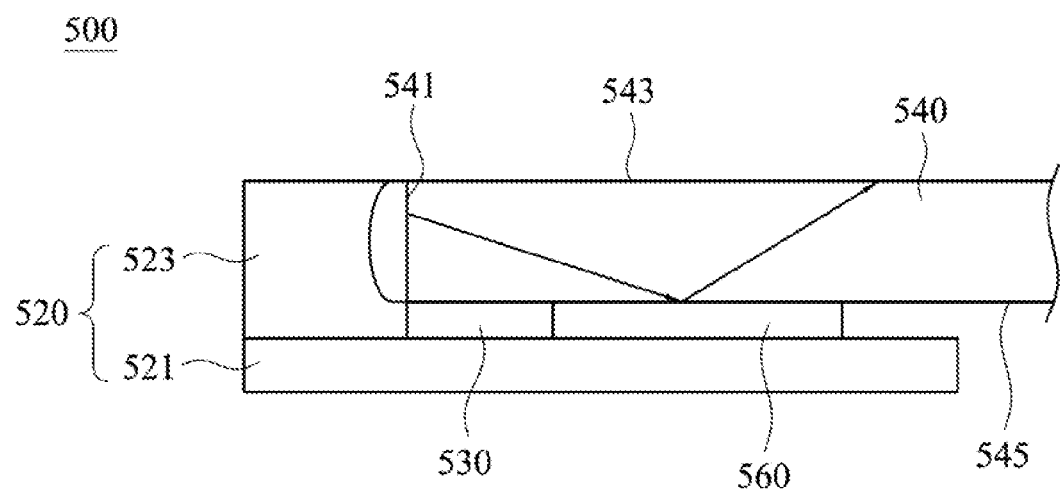
FIG. 8 is a schematic structural diagram showing a backlight module in accordance with a third embodiment of the present invention.

In the present invention, the disposition position of the light-adjusting member can be changed. Referring to FIG. 8, FIG. 8 is a schematic structural diagram showing a backlight module 500 in accordance with a third embodiment of the present invention. In the present embodiment, the backlight module 500 includes a light source 520, a light guide plate 540 and a light-adjusting member 560. The light guide plate 540 has a light-incident surface 541, a light-emitting surface 543 and a bottom surface 545. The light-emitting surface 543 is opposite to the bottom surface 545, and the light-incident surface 541 connects the light-emitting surface 543 and the bottom surface 545. As shown in FIG. 8, the light source 520 includes a circuit board 521 and plural light-emitting diodes 523 disposed on the circuit board 521, and the light-emitting diodes 523 are electrically connected to the circuit board 521. A portion of the bottom surface 545 of the light guide plate 540 is adhered on the circuit board 521 via an adhesive member 530 like as OCA (Optical Clear Adhesive). In the present embodiment, the light-adjusting member 560 is disposed on the circuit board 521 and is located below the bottom surface 545 of the light guide plate 540 near the light-incident surface 541. Therefore, one portion of light generated by the light-emitting diodes 523 can enter the light guide plate 540 from the light-incident surface 541 and emit out from the light-emitting surface 543, and the other portion of light generated by the light-emitting diodes 523 can be reflected by the light-adjusting member 560 and enter the light guide plate 540 from the bottom surface 545 to emit out from the light-emitting surface 543. It is noted that the function and the structure of the light-adjusting member 560 are similar to those of the light-adjusting member 160, and will not be described again herein.

Figure 9:
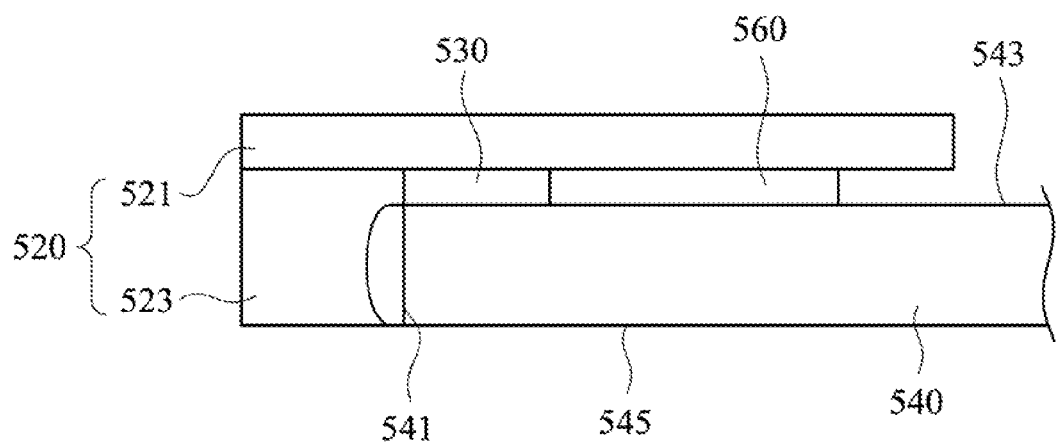
FIG. 9 is a schematic structural diagram showing a backlight module in accordance with a fourth embodiment of the present invention.

Referring to FIG. 9, FIG. 9 is a schematic structural diagram showing a backlight module 600 in accordance with a fourth embodiment of the present invention. In the present embodiment, the structure of the backlight module 600 is similar to the structure of the backlight module 500, and the main difference therebetween is that the circuit board 521 of the light source 520 is disposed above the light-emitting surface 543 of the light guide plate 540. In other words, a portion of the light-emitting surface 543 of the light guide plate 540 is adhered to the circuit board 521 of the light source 520 via the adhesive member 530. In the present embodiment, the light-adjusting member 560 is disposed on the circuit board 521 and is located above the light-emitting surface 543 of the light guide plate 540 near the light-incident surface 541. Therefore, one portion of light generated by the light-emitting diodes 523 can enter the light guide plate 540 from the light-incident surface 541 and emit out from the light-emitting surface 543, and the other portion of light generated by the light-emitting diodes 523 can be reflected by the light-adjusting member 560 and emit out from the light-emitting surface 543, so as to achieve the same effect as the light-adjusting member 160.

Figure 10:
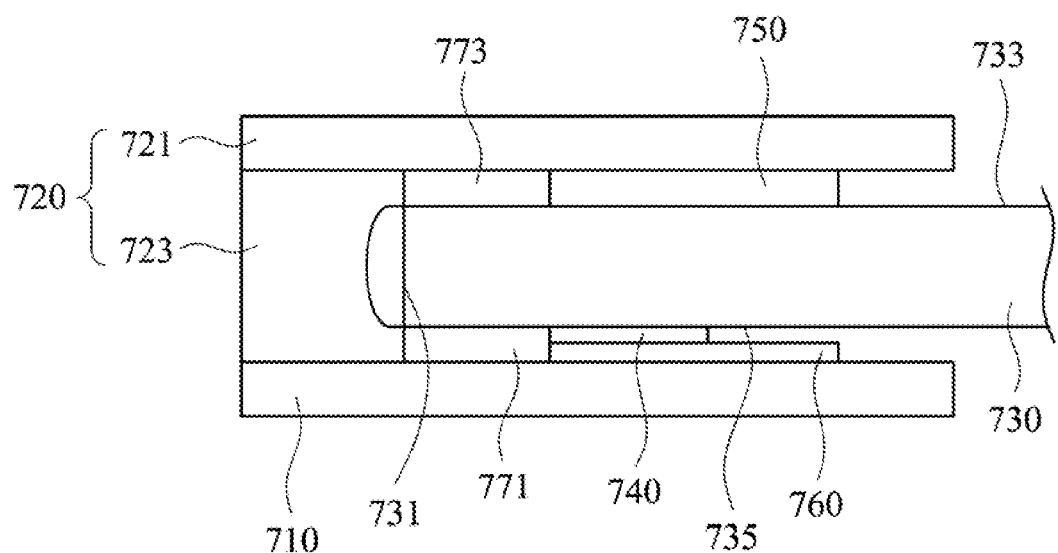
FIG. 10 is a schematic structural diagram showing a backlight module in accordance with a fifth embodiment of the present invention.

Referring to FIG. 10, FIG. 10 is a schematic structural diagram showing a backlight module 700 in accordance with a fifth embodiment of the present invention. In the present embodiment, the backlight module 700 includes a back plate 710, a light source 720, a light guide plate 730, a first light-adjusting member 740, a second light-adjusting member 750 and a light source reflector 760. As shown in FIG. 10, the light guide plate 730 is adhered on the back plate 710 via an adhesive member 771 like as OCA (Optical Clear Adhesive). The light source reflector 760 is disposed below the bottom surface 735 of the light guide plate 730 near the light-incident surface 731, and the first light-adjusting member 740 is disposed between the bottom surface 735 and the light source reflector 760. The light source 720 includes a circuit board 721 and plural light-emitting diodes 723 disposed on the circuit board 721. The circuit board 721 of the light source 720 is disposed above the light-emitting surface 733 of the light guide plate 730, and a portion of the light-emitting surface 733 of the light guide plate 730 is adhered to the circuit board 721 of the light source 720 via an adhesive member 773 like as OCA (Optical Clear Adhesive). In the present embodiment, the second light-adjusting member 750 is disposed on the circuit board 721 and is located above the light-emitting surface 733 of the light guide plate 730 near the light-incident surface 731. Therefore, one portion of light generated by the light-emitting diodes 723 can be reflected by the first light-adjusting member 740 and emit out from the light-emitting surface 733, and the other portion of light generated by the light-emitting diodes 723 can be reflected by the second light-adjusting member 750 and emit out from the light-emitting surface 733, so as to achieve the same effect as the light-adjusting member 160.

Figure 11:
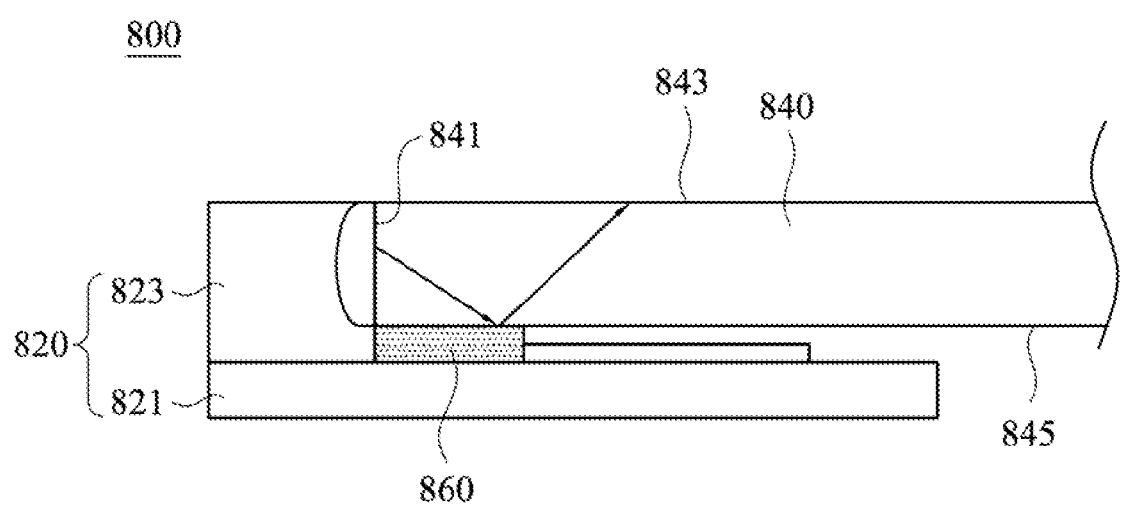
FIG. 11 is a schematic structural diagram showing a backlight module in accordance with a sixth embodiment of the present invention.

In the present invention, the light-adjusting member can be designed as an adhesive member. Referring to FIG. 11, FIG. 11 is a schematic structural diagram showing a backlight module 800 in accordance with a sixth embodiment of the present invention. The backlight module 800 of the present embodiment includes a light source 820, a light guide plate 840 and a light-adjusting member 860. The light guide plate 840 has a light-incident surface 841, a light-emitting surface 843 and a bottom surface 845. The light-emitting surface 843 is opposite to the bottom surface 845, and the light-incident surface 841 connects the light-emitting surface 843 and the bottom surface 845. As shown in FIG. 11, the light source 820 includes a circuit board 821 and plural light-emitting diodes 823 disposed on the circuit board 821, and the light-emitting diodes 823 are electrically connected to the circuit board 821. It is noted that, the light-adjusting member 860 of the present embodiment is an adhesive member with stickiness. Therefore, a portion of the bottom surface 845 of the light guide plate 840 can be adhered to the circuit board 821 via the light-adjusting member 860. In one embodiment, the light-adjusting member 860 is disposed on the circuit board 821 and is located below the bottom surface 845 of the light guide plate 840 near the light-incident surface 841.

Referring to FIG. 11 again, the light-adjusting member 860 is colored, and the color of the light-adjusting member 860 also can be expressed by a chromaticity coordinate value of one point in the chromaticity coordinate diagram of 1931 CIE. Therefore, one portion of light generated by the light-emitting diodes 823 can enter the light guide plate 840 from the light-incident surface 841 and emit out from the light-emitting surface 843, and the other portion of light generated by the light-emitting diodes 823 can be reflected by the light-adjusting member 860 and enter the light guide plate 840 from the bottom surface 845 to emit out from the light-emitting surface 843. Therefore, after light generated by the light source 820 is affected by the light-adjusting member 860, the color of light emitting out from the light-emitting surface 843 of the light guide plate 840 can be changed. In the present embodiment, the circuit board 821 of the light source 820 is disposed below the bottom surface 845 of the light guide plate 840. In other embodiments, the circuit board 821 of the light source 820 can be disposed above the light-emitting surface 843 of the light guide plate 840. In other words, a portion of the light-emitting surface 843 of the light guide plate 840 can be adhered to the circuit board 821 of the light source 820.

Figure 12:
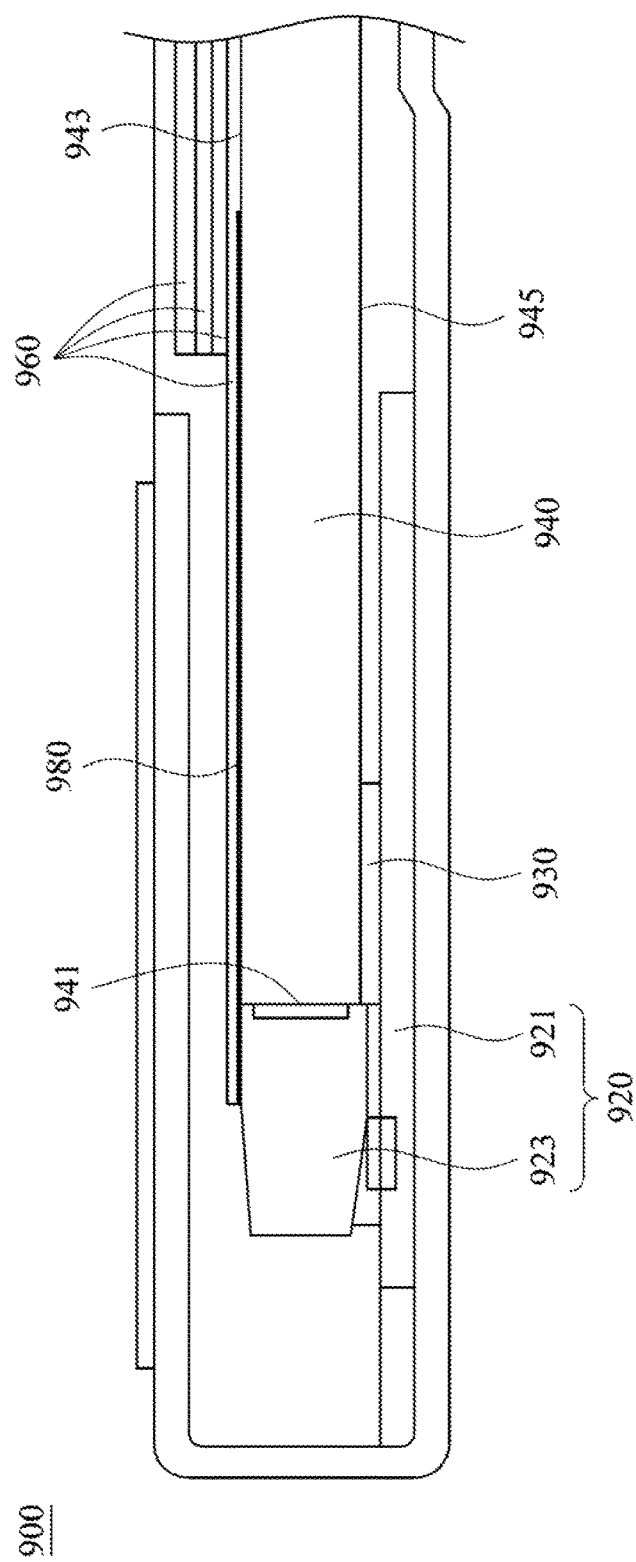
FIG. 12 is a schematic structural diagram showing a backlight module in accordance with a seventh embodiment of the present invention.

In the present invention, the disposition position of the light-adjusting member can be changed. Referring to FIG. 12, FIG. 12 is a schematic structural diagram showing a backlight module 900 in accordance with a seventh embodiment of the present invention. The backlight module 900 includes a light source 920, a light guide plate 940, a diffusion sheet 960 and a light-adjusting member 980. The light guide plate 940 has a light-incident surface 941, a light-emitting surface 943 and a bottom surface 945. The light-emitting surface 943 is opposite to the bottom surface 945, and the light-incident surface 941 connects the light-emitting surface 943 and the bottom surface 945. As shown in FIG. 12, the light source 920 includes a circuit board 921 and plural light-emitting diodes 923 disposed on the circuit board 921, and the light-emitting diodes 923 is electrically connected to the circuit board 921. A portion of the bottom surface 945 of the light guide plate 940 is adhered to the circuit board 921 via an adhesive member 930.

Referring to FIG. 12 again, in the present embodiment, the diffusion sheet 960 is disposed on the light-emitting surface 943 of the light guide plate 940. In the present embodiment, the number of the diffusion sheet 960 is multiple, and one side of the bottom diffusion sheet 960 extends beyond the light-incident surface 941 of the light guide plate 940. The light-adjusting member 980 is disposed between a bottom surface of the bottom diffusion sheet 960 and the light-emitting surface 943 of the light guide plate 940. Preferably, both of one side of the light-adjusting member 980 and one side of the bottom diffusion sheet 960 extend beyond the light-incident surface 941 of the light guide plate 940 and cover a portion of the light-emitting diodes 923. Therefore, one portion of light generated by the light-emitting diodes 923 can enter the light guide plate 940 from the light-incident surface 941 and emit out from the light-emitting surface 941, and the other portion of light generated by the light-emitting diodes 923 can be reflected by the light-adjusting member 980 and enter the light guide plate 940 to emit out from the light-emitting surface 943. It is noted that, the function and the structure of the light-adjusting member 980 are similar to those of the light-adjusting member 160, and will not be described again herein.

According to the aforementioned embodiments of the present invention, the present invention uses the light-adjusting member to reduce the chromaticity difference value between the light source chromaticity and light guide plate chromaticity, the chromaticity difference value between the light guide plate chromaticity and the display panel chromaticity and the chromaticity difference value between the light guide plate chromaticity and the required chromaticity, thus solving the problems of the color cast between the light source and the light guide plate, the color cast between the light guide plate and the display panel or the color cast between the light guide plate and the required chromaticity.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:
1. A backlight module, comprising:
a light source, wherein a light source chromaticity is obtained by measuring light generated by the light source;
a light guide plate having a light-incident surface and a light-emitting surface, wherein light generated by the light source enters the light guide plate from the light-incident surface and emits out from the light-emitting surface; and
a light-adjusting member, wherein with the light-adjusting member, a first light guide plate chromaticity is measured and obtained from the light-emitting surface of the light guide plate, and there is a first difference value between the first light guide plate chromaticity and the light source chromaticity;
wherein without the light-adjusting member, a second light guide plate chromaticity is measured and obtained from the light-emitting surface of the light guide plate, and there is a second difference value between the second light guide plate chromaticity and the light source chromaticity, and the first difference value is different from the second difference value;
wherein the light guide plate further has a bottom surface opposite to the light-emitting surface;
wherein the backlight module further comprises a component disposed below the bottom surface and/or above the light-emitting surface of the light guide plate;
wherein the light guide plate further has a central area and a lateral area;
wherein the central area is not covered by the component;
wherein the lateral area is covered by the component and is located near the light-incident surface;
wherein the light-adjusting member is independent from the light guide plate, and is disposed below the bottom surface and/or above the light-emitting surface of the light guide plate, and is located at the lateral area of the light guide plate while being absent from the central area of the light guide plate.

2. The backlight module of claim 1, wherein the component is a light source reflector, wherein the light-adjusting member is disposed between the light source reflector and the bottom surface of the light guide plate, and is located near the light-incident surface.

3. The backlight module of claim 1, wherein
the light source further comprises a circuit board and a plurality of light-emitting diodes disposed on the circuit board;
wherein the component is the circuit board; and
the light-adjusting member is disposed between the circuit board and the light guide plate and located near the light-incident surface.

4. The backlight module of claim 3, wherein the light-adjusting member is an adhesive member with a color used to adhere the light guide plate to the circuit board.

5. The backlight module of claim 1, further comprising a diffusion sheet disposed on the light-emitting surface of the light guide plate, wherein the light-adjusting member is disposed between a bottom surface of the diffusion sheet and the light-emitting surface and located near the light-incident surface.

6. The backlight module of claim 5, wherein one end of the diffusion sheet and one end of the light-adjusting member extend beyond the light-incident surface of the light guide plate in a direction toward the light source.

7. The backlight module of claim 6, wherein the one end of the diffusion sheet and the one end of the light-side adjusting member extend to cover a portion of the light source.

8. The backlight module of claim 1, wherein the light-adjusting member is a film formed from ink.

9. A display device, comprising:
a backlight module of claim 1;
a display panel disposed in front of the light-emitting surface of the light guide plate.

10. The backlight module of claim 1, wherein the light-adjusting member is a strip structure which extends along the light source from one side to the other side of the light guide plate.

11. A display device, comprising:
a light source;
a light guide plate having a light-incident surface and a light-emitting surface, wherein light generated by the light source enters the light guide plate from the light-incident surface and emits out from the light-emitting surface;
a display panel disposed in front of the light-emitting surface; and
a light-adjusting member, wherein with the light-adjusting member, an adjusted light guide plate chromaticity is measured and obtained from the light-emitting surface of the light guide plate, and a first display panel chromaticity is measured and obtained from the display panel, and there is a first difference value between the adjusted light guide plate chromaticity and the first display panel chromaticity;
wherein without the light-adjusting member, an original light guide plate chromaticity is obtained from the light-emitting surface of the light guide plate, and a second display panel chromaticity is measured and obtained from the display panel, and there is a second difference value between the second display panel chromaticity and the original light guide plate chromaticity, and the first difference value is smaller than the second difference value;
wherein the light guide plate further has a bottom surface opposite to the light-emitting surface;
wherein the backlight module further comprises a component disposed below the bottom surface and/or above the light-emitting surface of the light guide plate;
wherein the light guide plate further has a central area and a lateral area;
wherein the central area is not covered by the component;
wherein the lateral area is covered by the component and is located near the light-incident surface;
wherein the light-adjusting member is independent from the light guide plate, and is disposed below the bottom surface and/or above the light-emitting surface of the light guide plate, and is located at the lateral area of the light guide plate instead of being located at the central area of the light guide plate.

12. The display device of claim 11, wherein the component is a light source reflector, wherein the light-adjusting member is disposed between the light source reflector and the bottom surface of the light guide plate, and is located near the light-incident surface.

13. The display device of claim 11, wherein
the light source further comprises a circuit board and a plurality of light-emitting diodes disposed on the circuit board;

wherein the component is the circuit board; and the light-adjusting member is disposed between the circuit board and the light guide plate and located near the light-incident surface.

14. The display device of claim 13, wherein the light-adjusting member is an adhesive member with a color used to adhere the light guide plate on the circuit board.

15. The display device of claim 11, wherein the light-adjusting member is a film formed from ink.

16. The display device of claim 11, further comprising a diffusion sheet disposed on the light-emitting surface of the light guide plate, wherein the light-adjusting member is disposed between a bottom surface of the diffusion sheet and the light-emitting surface and located near the light-incident surface.

17. The display device of claim 16, wherein one side of the diffusion sheet and the light-adjusting member beyond the light-incident surface of the light guide plate.

18. A display device, comprising:
a light source;
a light guide plate having a light-incident surface and a light-emitting surface, wherein light generated by the light source enters the light guide plate from the light-incident surface and emits out from the light-emitting surface;
a display panel disposed in front of the light-emitting surface; and
a light-adjusting member, wherein with the light-adjusting member, a first light guide plate chromaticity is measured and obtained from the light-emitting surface of the light guide plate, and there is a first difference value between the first light guide plate chromaticity and a required chromaticity;
wherein without the light-adjusting member, a second light guide plate chromaticity is measured and obtained from the light-emitting surface of the light guide plate, and there is a second difference value between the second light guide plate chromaticity and the required chromaticity, and the first difference value is smaller than the second difference value;
wherein the light guide plate further has a bottom surface opposite to the light-emitting surface;
wherein the backlight module further comprises a component disposed below the bottom surface and/or above the light-emitting surface of the light guide plate;
wherein the light guide plate further has a central area and a lateral area;
wherein the central area is not covered by the component;
wherein the lateral area is covered by the component and is located near the light-incident surface;

wherein the light-adjusting member is independent from the light guide plate, and is disposed below the bottom surface and/or above the light-emitting surface of the light guide plate, and is located at the lateral area of the light guide plate instead of being located at the central area of the light guide plate.

19. The display device of claim 18, wherein the component is a light source reflector, wherein the light-adjusting member is disposed between the light source reflector and the bottom surface of the light guide plate, and is located near the light-incident surface.

20. The display device of claim 18, wherein
the light source further comprises a circuit board and a plurality of light-emitting diodes disposed on the circuit board;
wherein the component is the circuit board; and
the light-adjusting member is disposed between the circuit board and the light guide plate and located near the light-incident surface.

21. The display device of claim 20, wherein the light-adjusting member is an adhesive member with a color which can be used to adhere the light guide plate on the circuit board.

22. The display device of claim 18, wherein the light-adjusting member is a film formed from ink.

23. The display device of claim 18, further comprising a diffusion sheet disposed on the light-emitting surface of the light guide plate, wherein the light-adjusting member is disposed between a bottom surface of the diffusion sheet and the light-emitting surface and is located near the light-incident surface.

24. The display device of claim 23, wherein one side of the diffusion sheet and the light-adjusting member extends beyond the light-incident surface of the light guide plate.

25. The backlight module of claim 1, wherein a color of the light-adjusting member is complementary to a color represented by the light source chromaticity to thereby change a color of the light generated by the light source before emitting out from the light-emitting surface of the light guide plate, wherein the color of the light-adjusting member and the color represented by the light source chromaticity are made complementary by utilizing a line segment drawn on a chromaticity coordinate diagram.

26. The backlight module of claim 25, wherein the line segment passes through a point in a white color area of the chromaticity coordinate diagram, two end points of the line are located outside of the white color area, and the two end points respectively correspond to the color represented by the light source chromaticity and the color of the light-adjusting member.

* * * * *